(12) United States Patent
Mumford et al.

(10) Patent No.: US 9,022,303 B2
(45) Date of Patent: May 5, 2015

(54) FUEL INJECTION VALVE AND METHOD FOR CO-INJECTING A LIQUID AND A GASEOUS FUEL INTO THE COMBUSTION CHAMBER OF AN INTERNAL COMBUSTION ENGINE

(75) Inventors: David Mumford, Vancouver (CA); Sandeep Munshi, Delta (CA)

(73) Assignee: Westport Power Inc., Vancouver, BC (CA)

( * ) Notice: Subject to any disclaimer, the term of this patent is extended or adjusted under 35 U.S.C. 154(b) by 34 days.

(21) Appl. No.: 12/971,730

(22) Filed: Dec. 17, 2010

(65) Prior Publication Data

US 2011/0108631 A1 May 12, 2011

Related U.S. Application Data

(63) Continuation of application No. PCT/CA2009/000590, filed on Apr. 30, 2009.

(51) Int. Cl.
*B05B 7/06* (2006.01)
*F02M 21/02* (2006.01)
(Continued)

(52) U.S. Cl.
CPC ........... *F02M 21/0263* (2013.01); *F02M 43/04* (2013.01); *F02M 57/025* (2013.01); *F02M 63/0049* (2013.01); *Y02T 10/36* (2013.01); *Y02T 10/32* (2013.01); *F02D 19/0642* (2013.01);
(Continued)

(58) Field of Classification Search
CPC ............ F02M 21/0263; F02D 19/0642; F02D 19/0689; F02D 19/0694
USPC ........ 239/533.3, 533.2, 533.4, 398–409, 413, 239/414, 415, 533.8, 584
See application file for complete search history.

(56) References Cited

U.S. PATENT DOCUMENTS 4,823,756 A * 4/1989 Ziejewski et al. ............. 123/531
5,497,743 A   3/1996 Clarke
(Continued)

FOREIGN PATENT DOCUMENTS

CA    2359203    7/2002
EP    1274933    10/2004
(Continued)

OTHER PUBLICATIONS

E.C. Fernandes, M.V. Heitor and V. Sivadas, Towards controlled liquid atomization, 10th Intl. Symposium on Application of Laser Techniques to Fluid Mechanics, Jul. 10-13, 2000, Lisbon, Portugal.
(Continued)

*Primary Examiner* — Len Tran
*Assistant Examiner* — Joel Zhou
(74) *Attorney, Agent, or Firm* — Corridor Law Group, P.C.

(57) ABSTRACT

A fuel injection valve co-injects a liquid and a gaseous fuel into the combustion chamber of an internal combustion engine. A solid needle regulates the injection of liquid and gaseous fuels from a cavity in the fuel injection valve into the combustion chamber when the needle is lifted to its open position. In preferred embodiments, liquid fuel is metered and pressurized in an intensifier's cylinder provided within the valve body and the liquid fuel is delivered through a restricted flow passage into the cavity where it mixes with the gaseous fuel. The restricted flow passage can be formed by a small passage formed in the valve body or an annular passage between the needle and the valve body.

24 Claims, 8 Drawing Sheets

(51) Int. Cl.
  *F02D 19/06* (2006.01)
  *F02D 19/08* (2006.01)
  *F02M 43/04* (2006.01)
  *F02M 57/02* (2006.01)
  *F02M 63/00* (2006.01)

(52) U.S. Cl.
  CPC ........ *F02D 19/0689* (2013.01); *F02D 19/0694* (2013.01); *F02D 19/081* (2013.01)

(56) References Cited

U.S. PATENT DOCUMENTS

| | | | |
|---|---|---|---|
| 5,529,024 A * | 6/1996 | Wirbeleit et al. | ........... 123/25 C |
| 5,601,067 A | 2/1997 | Wirbeleit et al. | |
| 5,762,033 A | 6/1998 | Rembold et al. | |
| 5,979,410 A | 11/1999 | Grieshaber | |
| 6,073,862 A | 6/2000 | Touchette et al. | |
| 6,223,699 B1 | 5/2001 | Donauer et al. | |
| 6,336,598 B1 | 1/2002 | Touchette et al. | |
| 6,439,192 B1 | 8/2002 | Ouellette et al. | |
| 6,588,406 B2 | 7/2003 | Oprea | |
| 6,761,325 B2 * | 7/2004 | Baker et al. | ................ 239/533.3 |
| 7,124,959 B2 | 10/2006 | Baker et al. | |
| 2006/0086825 A1 * | 4/2006 | Date et al. | ..................... 239/408 |
| 2010/0199948 A1 * | 8/2010 | Rogak et al. | ................. 123/304 |

FOREIGN PATENT DOCUMENTS

| | | | | |
|---|---|---|---|---|
| JP | 63004365 | * | 1/1988 | ............. F02M 21/02 |
| JP | 63004365 | | 1/1998 | |
| WO | 2005031149 | | 4/2005 | |
| WO | 2008000095 | | 1/2008 | |

OTHER PUBLICATIONS

B.S. Brown and S. Rogak, The effect of two phase injection on the pilot diesel quantity in direct injection natural gas engines, Proceedings of Combustion Institute Canadian Section Annual Meeting, May 13-16, 2007, Banff, Alberta, Canada.

IInternational Search Report and Written Opinion of the International Searching Authority issued on Jul. 31, 2009 in connection with International Application No. PCT/CA2009/00590.

International Preliminary Report on Patentability issued on Jan. 5, 2011 in connection with International Application No. PCT/CA2009/00590.

* cited by examiner

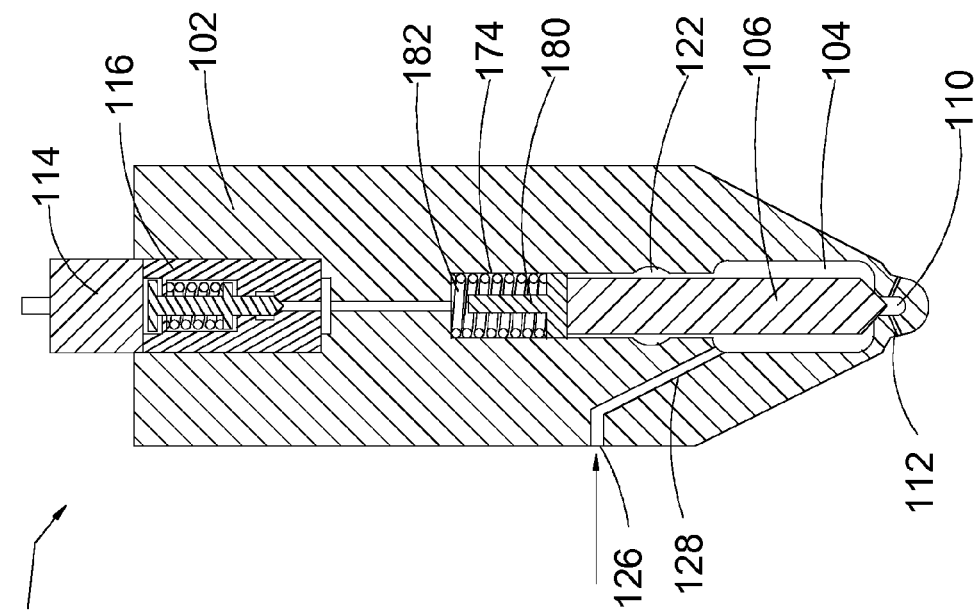

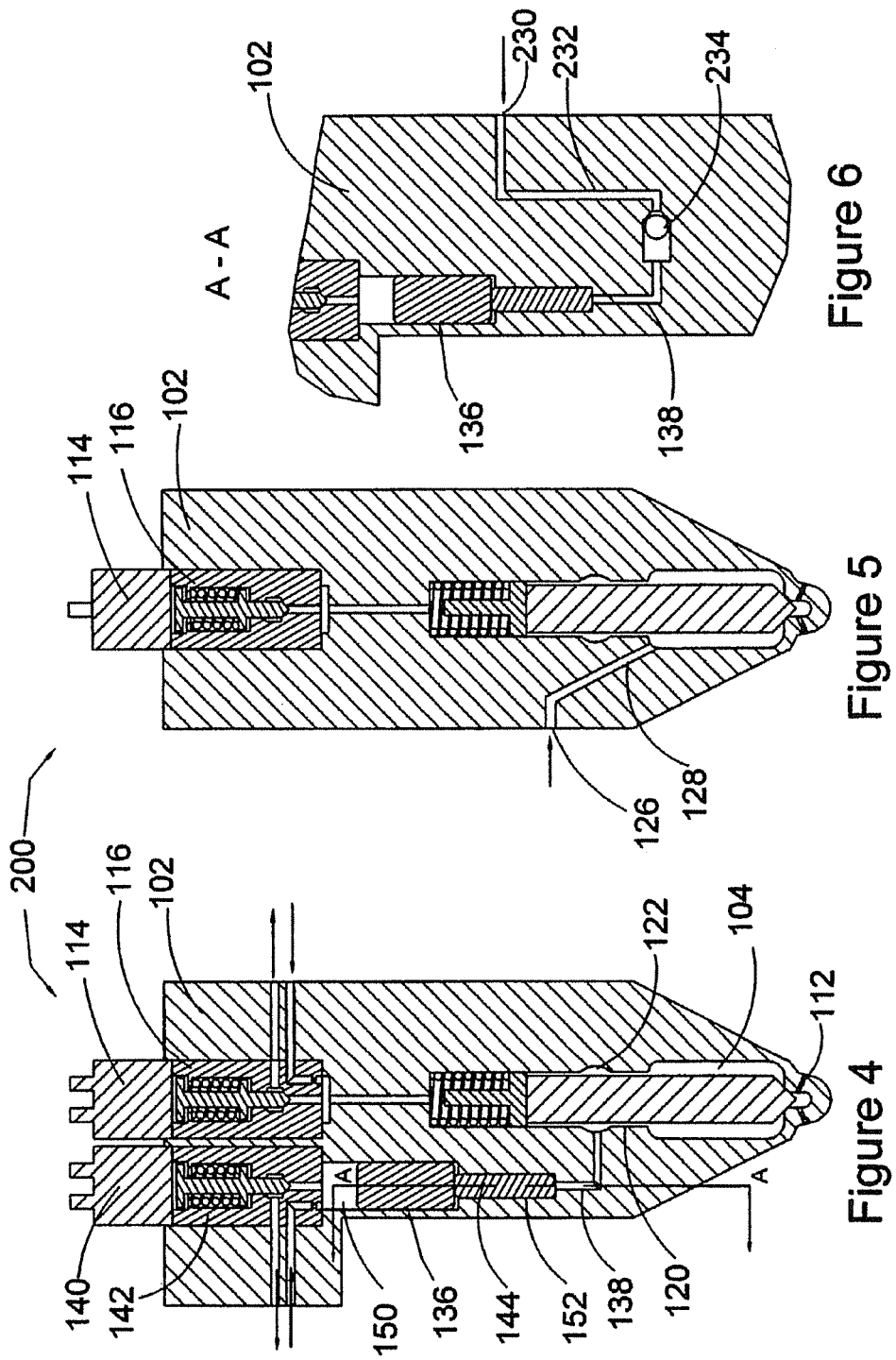

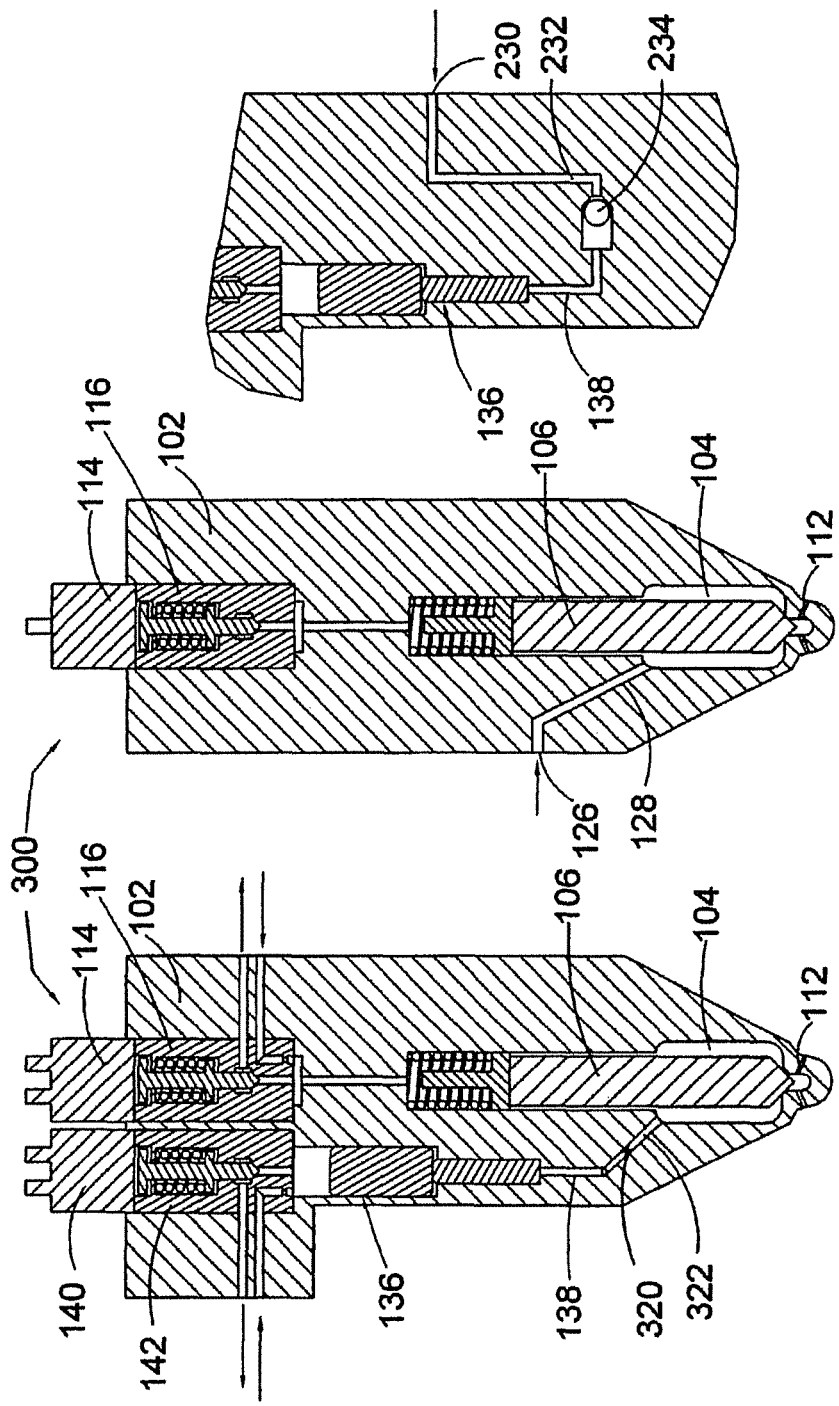

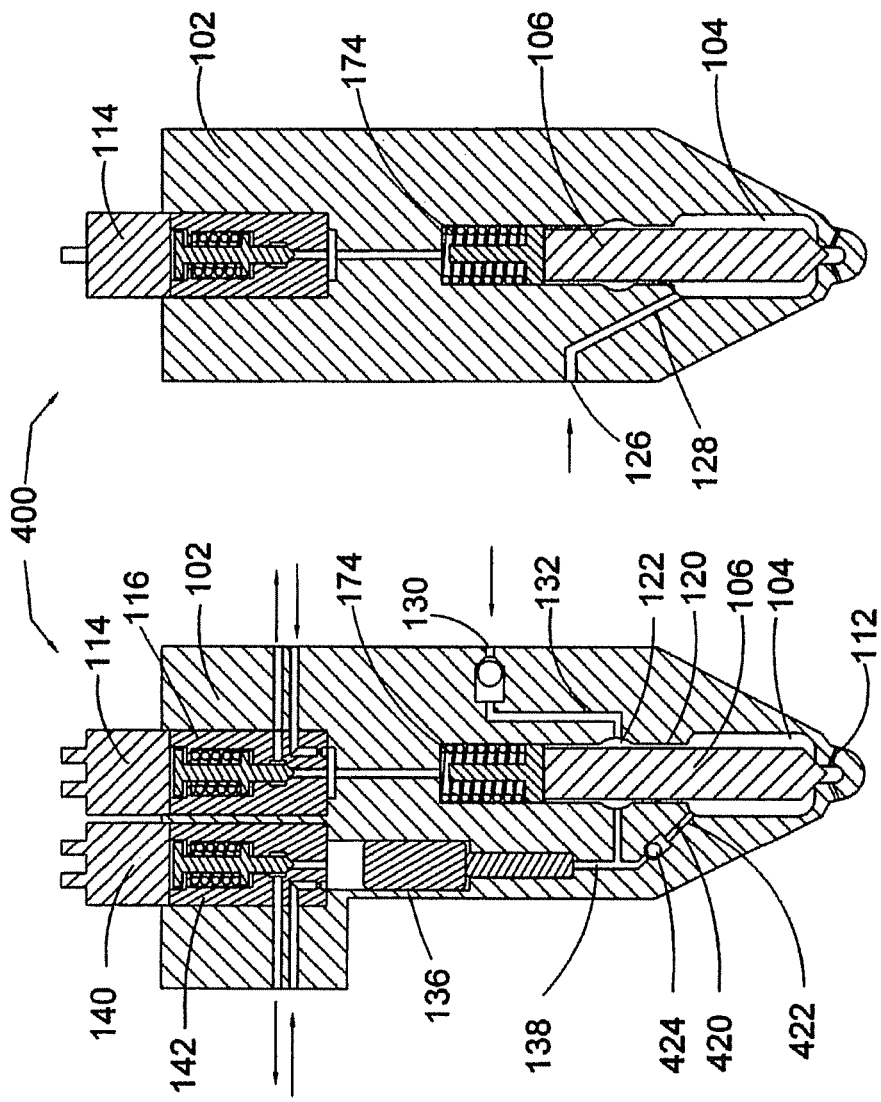

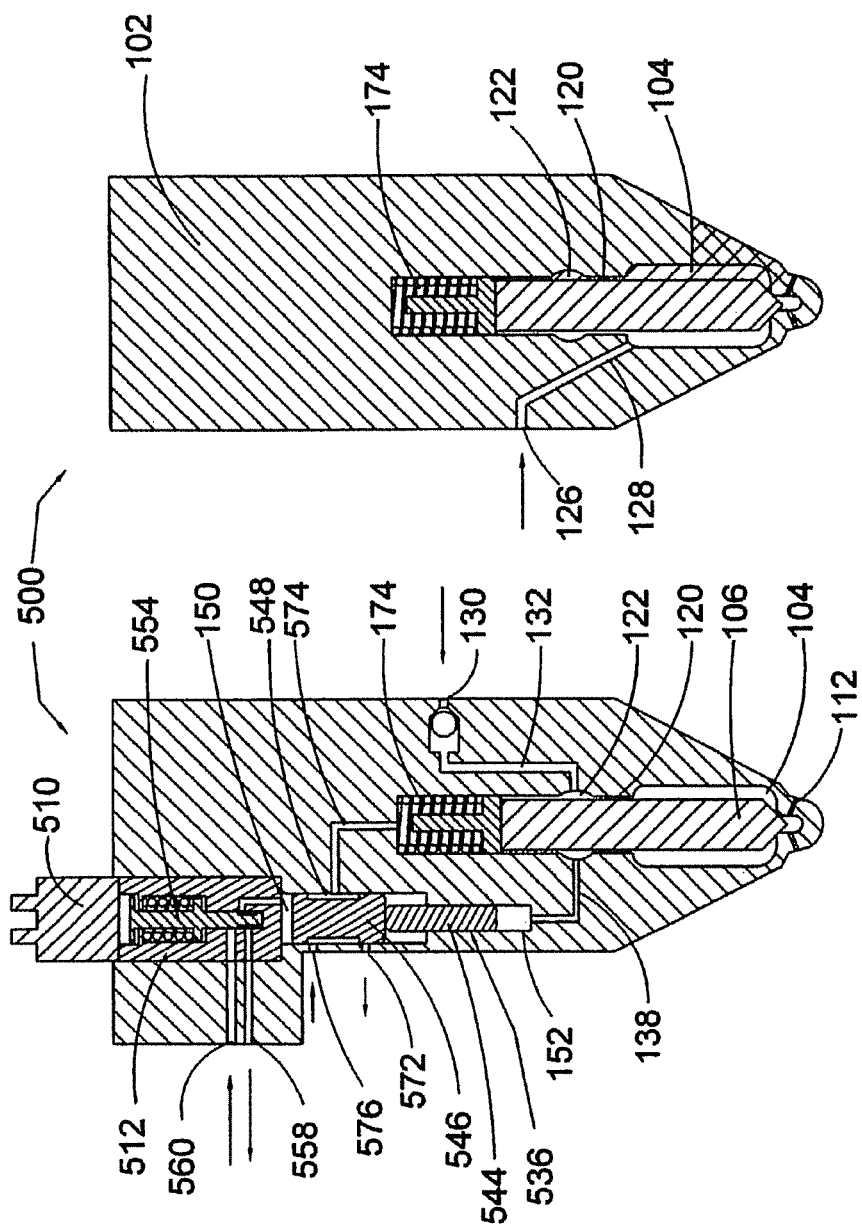

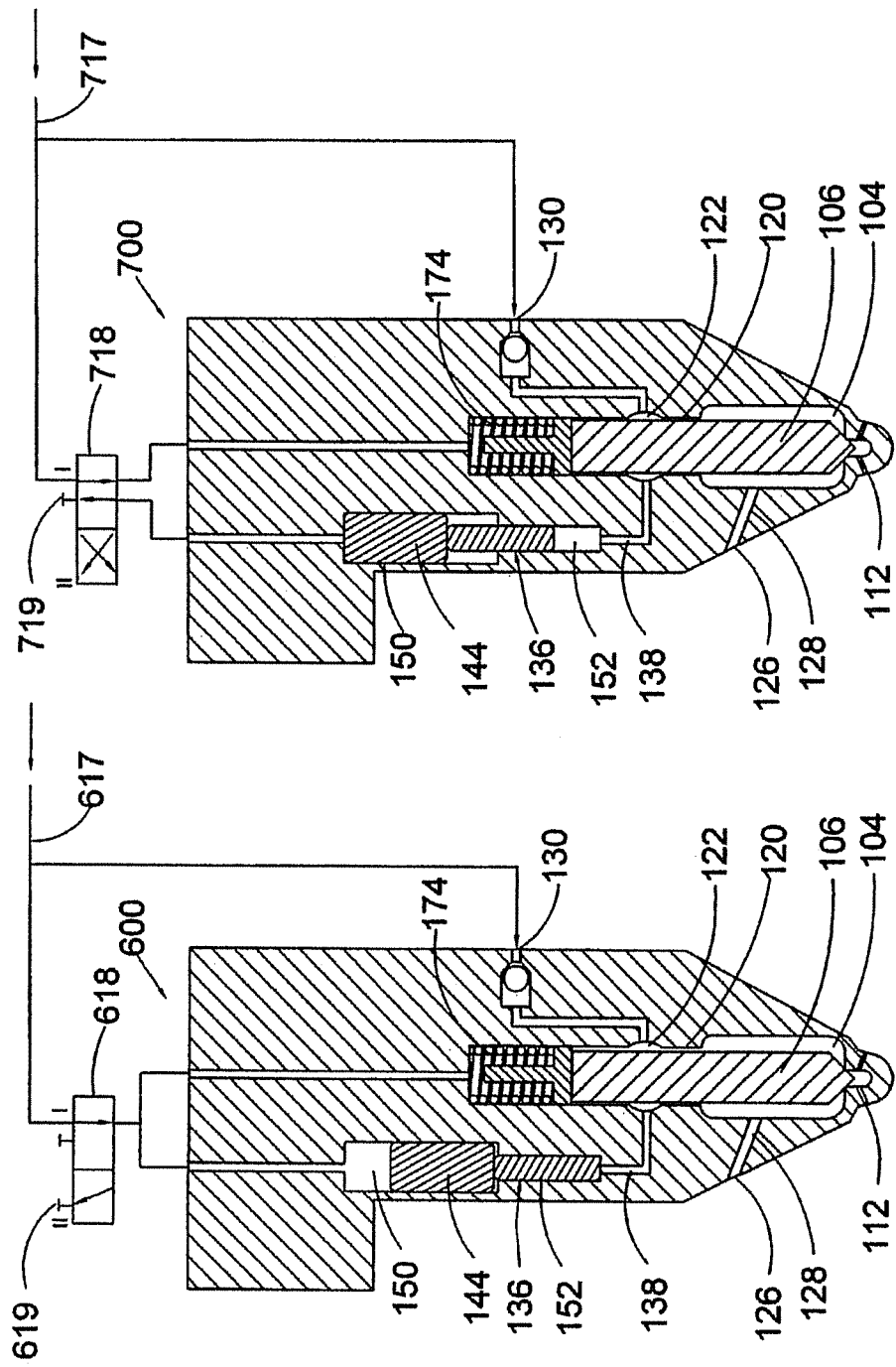

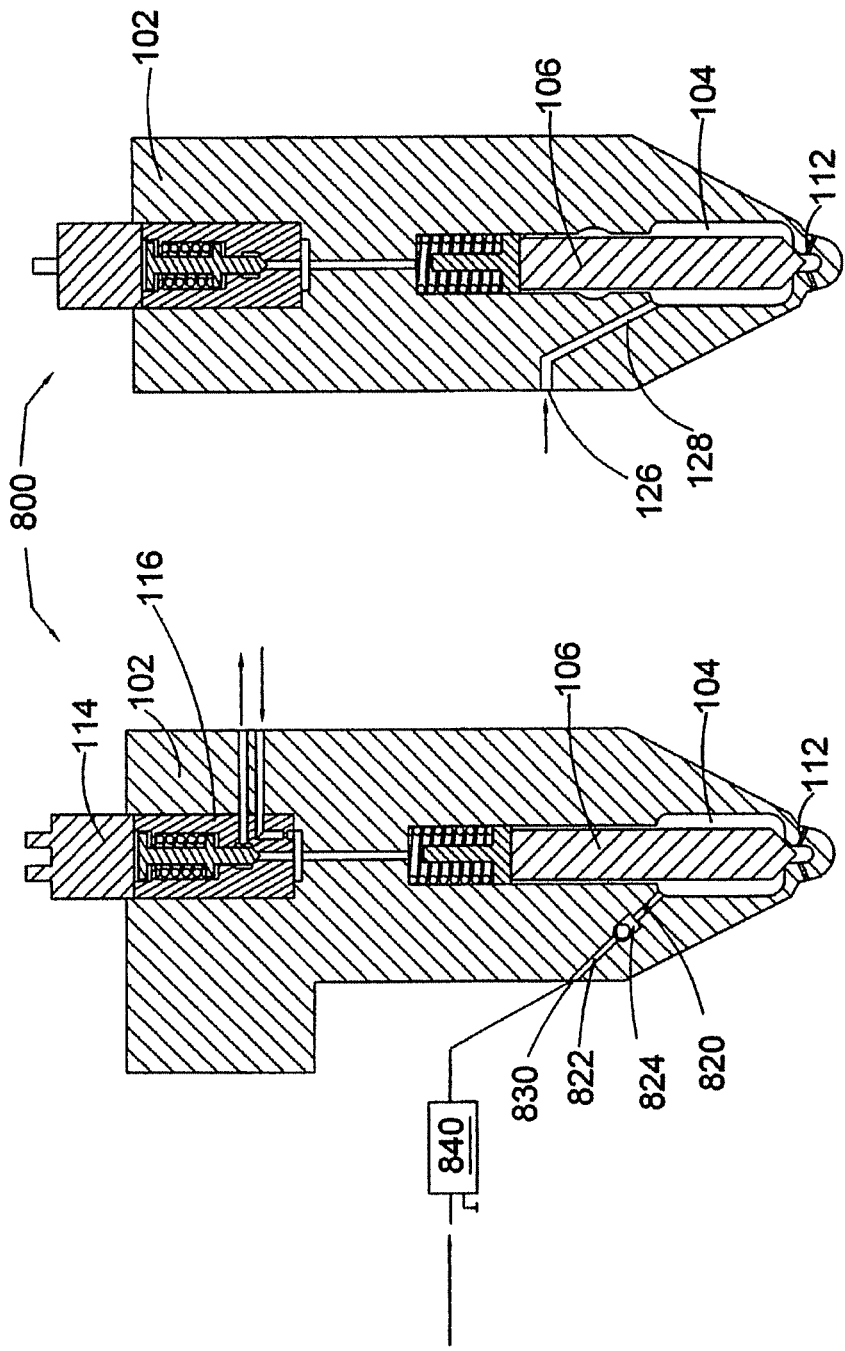

FUEL INJECTION VALVE AND METHOD FOR CO-INJECTING A LIQUID AND A GASEOUS FUEL INTO THE COMBUSTION CHAMBER OF AN INTERNAL COMBUSTION ENGINE

CROSS-REFERENCE TO RELATED APPLICATION(S)

This application is a continuation of International Application No. PCT/CA2009/000590, having an international filing date of Apr. 30, 2009, entitled "Fuel Injection Valve And Method For Co-Injecting A Liquid And A Gaseous Fuel Into The Combustion Chamber Of An Internal Combustion Engine". The '590 international application claimed priority benefits, in turn, from Canadian Patent Application No. 2,633,846 filed Jun. 27, 2008. The '590 international application is hereby incorporated by reference herein in its entirety.

FIELD OF THE INVENTION

The present invention relates to a fuel injection valve and a method for co-injecting a liquid and a gaseous fuel into the combustion chamber of an internal combustion engine. Both fuels are injected into the combustion chamber of the internal combustion engine when the needle is lifted from its seated position.

BACKGROUND OF THE INVENTION

Because of its ready availability, low cost and potential for reducing particulate emissions, natural gas is a promising substitute for diesel fuel for fuelling compression ignition engines, which are commonly known as "diesel-cycle" engines. While natural gas is disclosed as an example of a preferred fuel for the disclosed apparatus and method, persons familiar with the technology involved here will understand that these developments can also be implemented with other suitable fuels, such as hydrogen, propane and any other fuels that can be substituted for diesel fuel for fuelling an engine, while substantially matching the performance of a conventional diesel-fuelled engine, and/or lowering emissions of particulate matter and/or oxides of nitrogen ("NOx").

Conventional methods of introducing gaseous fuel into an engine premix all the gaseous fuel with the intake air, which is a method known as "fumigation". Engines using such a method have been unable to match the power, performance, and efficiency of diesel-fuelled engines, mostly because the amount of fuel that can be introduced in this manner can be limited in certain operating conditions because of the risk of engine knock, which happens when there is premature detonation fuel. It has been found that the favorable operating characteristics and high efficiency of conventional diesel-fuelled engines can be matched when at least some of the gaseous fuel is introduced directly into the engine's combustion chamber, late in the compression stroke. Accordingly, there is a need for an apparatus and method for injecting gaseous fuel directly into the combustion chamber.

A challenge with substituting gaseous fuels such as natural gas for liquid fuel in an engine designed to be fuelled with liquid fuels such as diesel fuel, is that, compared to liquid fuels like diesel fuel, much higher temperatures and pressures are typically needed to auto-ignite gaseous fuels. Therefore, in order to burn a gaseous fuel in a conventional engine with the same compression ratio without having to completely redesign the engine, some mechanism is required to assist with ignition of the gaseous fuel, such as a hot surface provided by a glow plug, or a fuel injection valve for introducing a pilot fuel. The pilot fuel can be a small quantity of liquid fuel, such as diesel fuel, which auto-ignites to trigger the ignition of the gaseous fuel.

Using a pilot fuel in addition to a main charge of gaseous fuel can require the installation of two independently operable injection valves, one for the pilot fuel and one for the gaseous main fuel. To avoid having to redesign and replace the cylinder head to accommodate two injection valves, it is preferable to employ one single valve for the injection of both the liquid and gaseous fuels that fits into the same opening as a conventional diesel fuel injection valve. The applicant's co-owned U.S. Pat. Nos. 6,073,862, 6,336,598, 6,439,192, 6,761,325 and 7,124,959, describe different embodiments of a dual fuel injection valve comprising a dual needle assembly. These patents describe preferred embodiments in which the outer and inner needles are each movable independently from each other between respective open and closed positions to independently inject the gaseous and the liquid fuels directly into the combustion chamber of an internal combustion engine. While using such a dual fuel injection valve facilitates installation in cylinder heads designed to receive a single diesel fuel injection valve, the construction of a fuel injection valve with two independently operable needles is somewhat complex and its assembly requires more precision and care compared to conventional single fuel injection valves that only have one needle.

Therefore it can be advantageous to use an injection valve having only one needle movable between a closed and an open position that injects both the gaseous and the liquid fuels into the combustion chamber of an engine when the valve is in its open position. Such an injection valve is described in published PCT/International Publication No. WO 2008/000095. Liquid fuel is passed through a bore provided within the needle and introduced into a chamber of the injection valve where it is entrained in the gaseous fuel during an injection event. The liquid fuel is atomized by the flow of gas to the combustion chamber. While the overall construction of the injection valve is simplified compared to a dual needle solution, the construction of a needle with an internal bore is still complex.

While there has been some progress in simplifying the construction of the injection valve for injecting a gaseous fuel and a liquid fuel into the combustion chamber of an internal combustion engine, there is still a need to further reduce the complexity of the injection valve construction.

SUMMARY OF THE INVENTION

A fuel injection valve co-injects a liquid fuel and a gaseous fuel directly into a combustion chamber of an internal combustion engine. The fuel injection valve comprises:
  (a) a valve body comprising a gaseous fuel inlet and a separate liquid fuel inlet, the valve body being mountable in the internal combustion engine with a nozzle end disposed within the combustion chamber;
  (b) a gaseous fuel supply passage disposed within the valve body and in fluid communication with the gaseous fuel inlet and a cavity near the nozzle end;
  (c) a needle disposed in the valve body and moveable between a closed position when it is pressed against a seat associated with the valve body and an open position when the valve is lifted away from the seat, allowing fluid communication between the cavity and the combustion chamber;

(d) a liquid fuel supply line disposed within the valve body and in fluid communication with the liquid fuel inlet and the cavity, wherein the liquid fuel supply line comprises a restricted flow passage, the restricted flow passage limiting liquid fuel flow into the cavity; and (e) an actuator that is operable to move the needle between the closed position and the open position.

The needle has a solid body. The liquid fuel supply line can further comprise a one-way valve allowing liquid fuel to flow from the liquid fuel inlet to the restricted flow passage and preventing fluid from escaping from the liquid fuel supply line back to the liquid fuel inlet.

In some embodiments the restricted flow passage is defined between the valve body and the needle. The injection valve can further comprise an upper chamber formed between the needle and the valve body, the upper chamber being in fluid communication with the liquid fuel supply line and separated from the cavity by an annular gap between the needle and the valve body. The annular gap can serve as the restricted flow passage through which liquid fuel can flow into the cavity which is near the nozzle end of the fuel injection valve. The upper chamber can be defined by the needle and a channel in the valve body or by a needle bore and a transverse groove in the needle. When the restricted flow passage is defined by the annular gap between the needle and the valve body, the injection valve can further comprise a second restricted flow passage within the valve body that fluidly connects the liquid fuel supply line to the cavity. In such embodiments, the second restricted flow passage can comprise a passageway formed by a bore with a restriction orifice disposed therein. In addition or in substitution for the restriction orifice, the second restricted flow passage can further comprise a one-way valve disposed therein, the one-way valve allowing liquid fuel to flow into the cavity and preventing fluid from flowing out of the cavity through the liquid fuel supply line.

In other embodiments the restricted flow passage is defined within the valve body and liquid fuel is not routed through a gap between the valve needle and the valve body. The restricted flow passage within the valve body can comprise a restriction orifice. In some embodiments, the restricted flow passage can further comprise a one-way valve allowing liquid fuel to flow from the liquid fuel inlet to the restricted flow passage and preventing fluid from escaping from the cavity through the liquid fuel supply line.

Even if not illustrated in the drawings, persons familiar with the technology involved here will understand that the one-way valve employed to prevent fluid from escaping from the cavity through the liquid supply line, as described above, can comprise a spring or other mechanical means for biasing the valve so that it opens only when the intensifier is activated.

In preferred embodiments the fuel injection valve further comprises an intensifier with an outlet in communication with the liquid fuel supply line to increase the pressure of the liquid fuel within the liquid fuel supply line upstream from the restricted flow passage. The intensifier can be disposed within the valve body and can further comprise a plunger that moves within a cylinder to meter the liquid fuel by drawing liquid fuel into the cylinder and then discharging from the cylinder a metered amount of liquid fuel. In some embodiments, the actuation of the plunger is adjustable to change the distance the plunger travels, whereby the metered amount can be changed. The plunger can be hydraulically actuated by a driving piston that has a cross-sectional area that is larger than the cross-sectional area of the plunger whereby the larger cross-sectional area of the driving piston enables the liquid fuel to be pressurized to a higher pressure than the pressure of the hydraulic fluid acting on the driving piston.

In preferred embodiments the liquid fuel supply line is in communication with the hydraulic fluid passages associated with the driving piston whereby the liquid fuel is employed as the hydraulic fluid for driving the intensifier. The actuator that moves the needle between the closed and open positions can be operable to activate the intensifier in addition to moving the needle. In other embodiments, a second actuator that is operable to activate only the intensifier can be employed.

A method co-injects a liquid fuel and a gaseous fuel directly into a combustion chamber of an internal combustion engine. The method comprises:

(a) delivering the gaseous fuel to a cavity within a fuel injection valve, the cavity being in communication with the combustion chamber when a needle is lifted away from a valve seat of the fuel injection valve;

(b) delivering the liquid fuel to the cavity through a liquid fuel supply line that comprises a restricted flow passage disposed within a body of the fuel injection valve or between the body and the needle, whereby at least some of the liquid fuel mixes with the gaseous fuel in the cavity before lifting the needle from the valve seat;

(c) co-injecting the liquid and gaseous fuels into the combustion chamber from the cavity by lifting the needle away from the valve.

The method can further comprise regulating flow of the liquid fuel through the restricted flow passage by controlling the liquid fuel pressure in the liquid fuel supply line. In some embodiments, liquid fuel pressure in the liquid fuel supply line can be regulated by regulating the liquid fuel pressure in a common rail fuel system.

The method can further comprise delivering the gaseous fuel to the cavity at injection pressure from a common rail gaseous fuel system. In preferred embodiments, the method can further comprise delivering the liquid fuel to the liquid fuel supply line from a common rail liquid fuel system with the liquid fuel pressure being higher than the injection pressure of the gaseous fuel by a predetermined amount.

In preferred embodiments, the method further comprises metering the liquid fuel before it is delivered to the cavity of the fuel injection valve. The metering of the liquid fuel can be done such that the amount of liquid fuel delivered to the cavity of the fuel injection valve is adjusted according to the operation of the internal combustion engine.

In preferred embodiments, the method further comprises increasing the pressure and metering the amount of the liquid fuel before it is delivered to the cavity, by the operation of an intensifier that communicates with the liquid fuel supply line.

With some of the embodiments disclosed herein, the method further comprises controlling the pressure in the liquid fuel supply line independently from the lifting of the needle.

BRIEF DESCRIPTION OF THE DRAWINGS

FIGS. 1 and 2 show respective front and side section views of a first embodiment of a dual fuel injection valve with a solid needle and a restricted flow passage formed by a gap between the needle and the body of the fuel injection valve for introducing liquid fuel into a cavity provided in the fuel injection valve;

FIGS. 4, 5 and 6 show respective front, side and detail section views of a second embodiment of a dual fuel injection valve wherein liquid fuel is supplied from the inlet directly into the passage that connects to the intensifier;

FIGS. 7, 8 and 9 show respective front, side and detail section views of a third embodiment of a dual fuel injection valve with a restricted flow passage formed within the injection valve body;

FIGS. 10 and 11 show respective front and side section views of a fourth embodiment of a dual fuel injection valve having a restricted flow passage formed between the needle and the needle cavity walls and an additional restricted flow liquid fuel passage formed within the valve body for injecting liquid fuel into a lower chamber of the fuel injection valve;

FIGS. 12 and 13 show a fifth embodiment of a dual fuel injection valve that shares some of the features shown in the first embodiment with respect to the restricted flow passage formed between the valve needle and the needle cavity walls, except that only one hydraulic fluid control valve is employed controlling liquid fuel metering and actuating the needle of the fuel injection valve;

FIGS. 14 and 15 show different hydraulic diagrams for metering the liquid fuel and actuating the needle of the fuel injection valve.

FIGS. 16 and 17 show a sixth embodiment of a dual fuel injection valve without an internal liquid intensifier and having a restricted flow passage formed within the injection valve body. In the embodiments illustrated in these figures both fuels are introduced directly into the cavity provided in the valve body.

Figure 3:
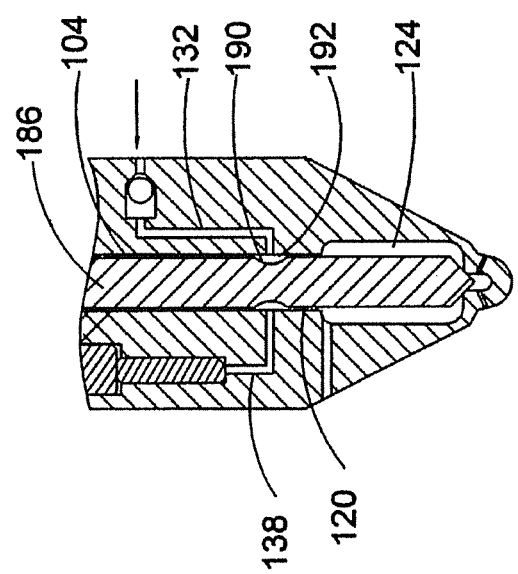
FIG. 3 shows the detail section view of a variant of the needle and of the valve body construction that can be used in the embodiments of the present fuel injection valve.

The schematic views shown in all of the figures are not drawn to scale, with some parts shown larger relative to the other parts to better illustrate their function.

DETAILED DESCRIPTION OF PREFERRED EMBODIMENT(S)

A fuel injection valve having one needle is capable of co-injecting a liquid fuel and a gaseous fuel into the combustion chamber of an internal combustion engine. The gaseous fuel and the liquid fuel are delivered to the same cavity within the fuel injection valve and then co-injected together into the combustion chamber of an internal combustion engine when the needle is lifted from its seat to an open position. Herein "co-injection" is used to refer to the simultaneous injection of both gaseous and liquid fuels directly into the combustion chamber of an internal combustion engine which is an approach that is technically distinct from engines that inject liquid and gaseous fuels into the combustion chamber separately.

In preferred embodiments, the gaseous fuel is natural gas, but it can be any other gaseous fuel that is combustible in an engine, such as propane or hydrogen. The liquid fuel can be diesel or other liquid fuels, such as dimethylether, that will auto-ignite in a compression ignition engine more readily than the gaseous fuel.

The illustrated embodiments show different arrangements for the injection valve needle and the optional internal intensifier that is used for metering and increasing the pressure of the liquid fuel. In some embodiments the valve needle and the intensifier are actuated by a shared actuator, and in other embodiments the valve needle and the intensifier can each have their own dedicated actuator. In the illustrated embodiments, the actuators are hydraulic actuators that use a high-pressure hydraulic fluid. By operating one or more hydraulic fluid control valves, the pressure of the hydraulic fluid is manipulated in a control chamber to control the movements of the valve needle and/or a plunger in the intensifier. For example, one hydraulic fluid control valve can be employed to connect the control chamber to a low pressure drain and an orifice can be used to restrict flow into the control chamber from a high pressure hydraulic fluid source. The hydraulic fluid control valves are typically solenoid valves which are electrically-operated and electronically-controlled. Conventional electronic controls can be used to control the activation of the solenoids and to thereby control the timing and duration of the metering and injection events. Instead of a hydraulic actuator, other known types of actuators can be substituted for actuating the valve needle and/or the intensifier, such as mechanical, electromagnetic, piezoelectric, or magnetostrictive actuators, or a combination of these. For example, to allow a smaller displacement produced by a piezoelectric actuator to be employed, it can be combined with a mechanical or hydraulic displacement amplifier. Mechanical displacement amplifiers such as levers and hydraulic displacement amplifiers that use pistons with different diameters are well known.

In preferred embodiments of the subject fuel injection valve, if the actuators are hydraulic actuators, the hydraulic liquid and the liquid fuel are the same fluid whereby the liquid fuel and the hydraulic fluid passages within the fuel injection valve are all connected to a high pressure liquid fuel manifold, known as a "common rail" when the same manifold serves a plurality of injection valves in a multi-cylinder engine.

To simplify the illustration of the internal fluid passages within the fuel injection valves, some of the schematic illustrations in the figures show fuel injection valves with a plurality of inlets and outlets. Persons familiar with the technology involved here will understand that interior fluid passages can be employed to reduce the number or fluid inlets and drain ports within the valve body in a substantially equivalent structure.

Referring to the drawings, FIGS. 1 and 2 show front and side section views of a preferred embodiment of a dual solenoid fuel injection valve. The exterior of the valve body can be shaped to fit the opening in the cylinder head of an internal combustion engine in which it is to be installed. In this embodiment, two hydraulic fluid control valves are used, one to control the metering and pressurizing of the liquid fuel and one for actuating the valve needle to inject the gaseous and liquid fuels into the combustion chamber. As illustrated, each of the hydraulic fluid control valves is actuated by a solenoid.

Fuel injection valve 100 has valve body 102 that includes cavity 104 which accommodates needle 106. In the illustrated position, needle 106 is pressed against seat 108 provided in valve body 102 and no fluid passes between cavity 104 and injection cavity 110. Needle 106 can be actuated by an actuator comprising hydraulic fluid control valve 116, which is operated by solenoid 114. When the actuator lifts needle 106 from its seated position, cavity 104 is fluidly connected to injection cavity 110 and injection orifices 112 to allow the injection of fuel into the combustion chamber of an internal combustion engine.

Needle 106 has a portion that extends in a bore provided within valve body 102 whereby annular passage 120 is created between needle 106 and the walls of the bore. The bore and needle 106 are sized to make the dimensions of annular passage 120 small so that it acts as a restricted flow passage for the liquid fuel flowing into cavity 104 through annular passage 120. Needle 106 has a solid body so that liquid fuel supplied to cavity 104 flows through annular passage 120 without passing through the body of needle 106. In this embodiment there is also upper chamber 122 that is also formed by an annular space between needle 106 and valve body 102. Upper chamber 122 and cavity 104 fluidly communicate with each other through restricted flow passage 120.

In some dual needle fuel injection valves known in the prior art, the valve needles are match-fit with the valve needle bores. In these cases, a liquid seal can be used to prevent gaseous fuel from leaking between the needle and the needle bore, and the match-fit combined with a small pressure differential between the gaseous fuel and the liquid in the liquid seal reduces to a negligible amount the liquid fuel that leaks into the gaseous fuel. A different approach is taught herein by the embodiment illustrated in FIGS. 1 and 2 and in all the other embodiments that illustrate an annular passage 120 fluidly connected to upper chamber 122. With the presently disclosed fuel injection valve, instead of trying to reduce leakage to a negligible amount, annular gap 120 is dimensioned to allow the controlled flow of pressurized liquid fuel into cavity 104 where it is mixed with gaseous fuel. In preferred embodiments, the flow rate through annular passage 120 can be adjusted by controlling the pressure of the liquid fuel that is delivered to annular passage 120, and by controlling the timing for adjusting the liquid fuel pressure. Because the restricted flow passage provided by annular passage 120 is designed to provide a flow path for the liquid fuel between the needle and the valve body in some embodiments the size of the gap can be larger compared to known fuel injection valves, and an advantage of this is that it can be more tolerant of dimensional irregularities that might be associated with the components of needle 106 and valve body 102, simplifying the manufacturing and assembling process of fuel injection valve 100.

Injection valve 100 can also include internal liquid fuel intensifier 136 for raising the pressure of the liquid fuel before delivering it into cavity 104. By raising the pressure of the liquid fuel the intensifier ensures that at least the metered amount of liquid fuel is introduced into cavity 104. Intensifier 136 is fluidly linked to upper chamber 122 through connecting passage 138 and can be operated through hydraulic fluid control valve 142 controlled by solenoid 140. Intensifier 136 comprises plunger 144 disposed in cylinder 152 and drive piston 146 disposed in drive chamber 150. Drive piston 146 has a cross-sectional area A1 and plunger 144 has smaller cross-sectional area A2. Plunger 144 and drive piston 146 can be made as two separate components as illustrated in FIG. 1 or as a single component having two portions of different cross-sections.

As illustrated in FIG. 1, in its normal position, hydraulic fluid control valve 142 is closed whereby control valve member 154 is biased by spring 156 into its seated position, blocking the communication between drain 158 and drive chamber 150. Hydraulic fluid supply passage 160, which is provided with restriction orifice 162, is in constant communication with drive chamber 150. Restriction orifice 162 slows the delivery of high-pressure hydraulic fluid when control valve member 154 is unseated by energizing solenoid 140, allowing hydraulic fluid pressure within drive chamber 150 to decrease, whereby drive piston 146 and plunger 144 rise to allow a metered amount of liquid fuel to flow into cylinder 152. After the desired amount of liquid fuel is drawn into cylinder 152, control valve member 154 is seated by de-energizing solenoid 140 so that drive chamber 150 is isolated from drain 158 and the high-pressure hydraulic fluid entering drive chamber 150 through supply passage 160 pushes drive piston 146 down, pressurizing the liquid fuel in cylinder 152, which is discharged back into connecting passage 138 and from there through annular passage 120 and into cavity 104.

Hydraulic fluid control valve 116 operates on the same principle as hydraulic fluid control valve 142, but to control movements of valve needle 106 instead of plunger 144. Between injection events, control valve member 164 is biased by control valve spring 170 into its seated position, blocking fluid communication between drain 172 and control chamber 174. Hydraulic fluid supply passage 176 is in constant communication with control chamber 174 through restriction orifice 178. When control valve member 164 is lifted from its seated position by energizing solenoid 114, hydraulic fluid is drained from control chamber 174 through open control valve 116 faster than hydraulic fluid can be replenished through restriction orifice 178, allowing hydraulic fluid pressure within control chamber 174 to decrease and valve needle 106 to lift against the bias of valve spring 182.

The aspects of fuel injection valve 100 that relate to the co-injection of gaseous and liquid fuels will now be explained in further detail in relation to the first embodiment illustrated in FIGS. 1 and 2.

Liquid fuel is supplied to fuel injection valve 100 at liquid fuel inlet 130 which communicates with the liquid fuel supply line that delivers liquid fuel from liquid fuel inlet 130 to cavity 104. In this embodiment, the liquid fuel supply line comprises liquid fuel passage 132, one-way valve 134, upper chamber 122 and connecting passage 138, which communicates with cylinder 152 of intensifier 136. One-way valve 134 permits flow of liquid fuel into upper chamber 122 and prevents backflow of liquid fuel in the opposite direction. Intensifier 136 meters liquid fuel by the amount that is displaced from cylinder 152 by operation of plunger 144. The liquid fuel supply line further comprises a restricted flow passage that is provided in this embodiment by annular passage 120 through which the metered liquid fuel flows when pushed out of intensifier 136 and into cavity 104.

When hydraulic fluid pressure in control chamber 174 is reduced to lift needle 106, the liquid fuel pressure in upper chamber 122 can be higher than the hydraulic fluid pressure in control chamber 174. To prevent liquid fuel from escaping through the annular gap above upper chamber 122, one or more features can be employed. For example, valve stop 180 can comprise a stem that contacts the upper end of control chamber 174, and the base of this stop can cover the opening for the passage that communicates with the hydraulic fluid passages, so that the liquid fuel is blocked from flowing in this direction. The base of valve stop 180 is preferably made to have a match fit with control chamber 174, to also prevent fluid flow from upper chamber 122 to control chamber 174. As a further example, seals, such as resilient o-rings, can be employed to seal the base of valve stop 180 against the valve body. In other embodiments the needle is match-fit to valve needle bore 118 between control chamber 174 and upper chamber 122, and this portion of valve needle bore 118 can be made long enough to achieve the desired sealing between these chambers. In another variant, the cross-sectional area of the needle varies along its longitudinal axis such that needle 106 is match-fit to the valve body only above upper chamber 122, with a smaller diameter below upper chamber 122 to provide the designed area for the restricted flow passage that is provided by annular passage 120.

Valve stop 180 is preferably affixed to needle 106 or made as an integral part of the needle to prevent liquid fuel from penetrating between the needle and the valve stop and separating and spacing these two components apart from one another.

Gaseous fuel is supplied to inlet 126 and flows through gaseous fuel passage 128 into cavity 104. Liquid fuel that is metered into cavity 104 can accumulate there with the gaseous fuel before both fuels are injected into the combustion chamber of an internal combustion engine when needle 106 is lifted from its seated position.

Prior to the fuel injection event, when solenoid 140 is de-energized, hydraulic fluid control valve 142 is biased in its closed position by spring 156. High pressure hydraulic fluid, supplied through passage 160 to drive chamber 150 maintains plunger 144 in a downwardly extended position. When the liquid fuel is employed as the hydraulic fluid, the hydraulic fluid pressure in drive chamber 150 is substantially equal to the rail pressure of the liquid fuel. Liquid fuel introduced through connecting passage 138 below plunger 144 is also substantially at the liquid fuel rail pressure. In this case the difference in cross-sectional areas between drive piston 146 and plunger 144 keeps plunger 144 in its downward extended position, maximizing the volume in drive chamber 150, above the plunger and minimizing the volume in cylinder 152, below plunger 144. As described above, even if the pressure of the hydraulic fluid is equal or lower than the liquid fuel pressure, the difference in cross-sectional area between drive piston 146 and plunger 144 is designed to keep plunger 144 in its downward extended position.

The metering of liquid fuel is performed as follows. Upon energizing solenoid 140, hydraulic fluid control valve 142 opens connecting drive chamber 150 to drain 158. The pressure within drive chamber 150 is reduced because hydraulic fluid drains through drain 158 faster than it can be replenished due to the restricted flow through orifice 162. The force created by the liquid fuel from connecting passage 138 on the smaller area A2 of plunger 144 is sufficient to lift the plunger while hydraulic fluid is drained from drive chamber 150 through open hydraulic fluid control valve 142, and liquid fuel is drawn into cylinder 152. The amount of liquid fuel that is metered can be controlled by controlling the length of time that solenoid 140 is energized, and controlling the travel length of plunger 144, thereby controlling the amount of liquid fuel that is drawn into cylinder 152. The metered amount of liquid fuel can be adjusted according to different engine operating conditions. For example, when the engine is operating at low loads, under predetermined operating conditions, less liquid fuel is introduced into the combustion chamber of the internal combustion engine. When the desired amount of liquid fuel has been drawn into cylinder 152, solenoid 140 is de-energized and control valve member 154 is restored to its closed position by spring 156. Alternatively, to meter a substantially constant amount of liquid fuel, solenoid 140 is energized until drive piston 146 reaches a stop provided within drive chamber 150 or until it reaches the top wall of drive chamber 150. By closing hydraulic fluid control valve 142, hydraulic fluid pressure within drive chamber 150 is again elevated to a pressure close to the rail pressure. The pressure created in drive chamber 150 moves plunger 144 downward to compress and pressurize the liquid fuel accumulated in cylinder 152. Pressurized liquid fuel is thereby forced out of cylinder 152, through connecting passage 138 into upper chamber 122. The pressure of the pressurized liquid fuel coming out of intensifier 136 is sufficient to further push the liquid fuel through the restricted flow passage provided by annular gap 120 into cavity 104. Pressurized liquid fuel that flows back through passage 132 towards inlet 130 is prevented from escaping by one-way valve 134, which when closed also stops the supply of additional liquid fuel.

An injection event is triggered when solenoid 114 is energized and control valve member 164 of hydraulic fluid control valve 116 is lifted from its seat such that control chamber 174 is in fluid communication with drain 172. Pressure in control chamber 174 is reduced because the hydraulic fluid drains through drain 172 faster than it can be replenished due to the restricted flow through orifice 178. When the pressure in control chamber 174 is reduced, the fluid pressure in chamber 104 acts on needle 106 to lift it away from needle seat 108 to thereby co-inject into the combustion chamber the gaseous and liquid fuels from cavity 104 through injection cavity 110 and injection orifices 112. Most of the liquid fuel atomization occurs when the mixture of liquid and gaseous fuel passes through injection orifices 112. The upward travel of needle 106 is limited by a mechanical stop 180 that limits the compression of needle spring 182.

The injection event stops when solenoid 114 is de-energized and hydraulic control valve member 164 is urged by control valve spring 170 into its closed position. Control chamber 174 is therefore connected again to the hydraulic fluid supply line and the pressure created within the chamber in combination with the force of valve spring 182 urges the needle into its seated position, pressed against valve seat 108.

In an alternate embodiment (not illustrated) the intensifier's drive piston and plunger can have the same cross-sectional area and in such embodiments they can both be replaced by a single plunger with a constant cross-sectional area. In this case, the pressure of the hydraulic fluid delivered to supply passage 160 is controlled such that, during the liquid fuel metering phase, it is lower than the pressure of the liquid fuel delivered to inlet 130 so that plunger 144 is lifted to its upper position and allows the flow of the desired amount of liquid fuel into cylinder 152. In this case, during the liquid fuel pressurizing phase, the pressure of hydraulic fluid delivered to passage 160 is higher than the pressure of the liquid fuel delivered to inlet 130 to push the metered amount of liquid fuel into cavity 104 through restricted flow passage 120. If the same liquid fuel rail that is connected to liquid fuel inlet 130 is connected to hydraulic fluid supply passage 160, then the plunger can be operated to meter the amount of liquid fuel that is delivered to cavity 104 if liquid fuel pressure is higher than gaseous fuel pressure, but it will not intensify the pressure of the liquid fuel because the pressure of the fluid delivered to drive chamber 150 will be at the same pressure as the liquid fuel that is drawn into cylinder 152.

In yet another embodiment that is not illustrated, the intensifier comprises a spring placed between the drive piston and the top wall of the drive chamber. Because of the mechanical assistance provided by the spring, even if the drive chamber has the same cross-sectional area as the intensifier cylinder, the liquid fuel can be intensified when the hydraulic fluid is delivered with the same pressure as the liquid fuel which is introduced into the intensifier cylinder. The intensifier can be actuated by a control valve that controls the delivery of hydraulic fluid to the drive chamber of the intensifier. When the control valve opens to connect the drive chamber to a drain or to a lower pressure circuit, liquid fuel supplied to the intensifier cylinder lifts the plunger and compresses the spring. When the control valve closes, hydraulic fluid delivered to the drive chamber pushes the intensifier's piston down, metering and pressurizing the liquid fuel that is expelled from the cylinder of the intensifier.

In still yet another embodiment (not illustrated), the intensifier's plunger can be actuated directly by a solenoid, for example a tubular solenoid, without the use of a hydraulic fluid control valve. Apart from the type of actuator, the intensifier can be operated in a similar manner to the embodiments described above, to pressurize and meter the desired amount of liquid fuel.

Other embodiments of the fuel injection valve are illustrated in FIGS. 3 to 15. These embodiments have many components that are equivalent to like components of the embodiment presented in FIGS. 1 and 2 and like components are identified by like reference numbers. Persons familiar with the technology involved here will understand that in this disclosure like-numbered components function in substantially the same way in each embodiment. Accordingly, if like components have already been described with respect to one embodiment, while identified in the Figures for other embodiments, the purpose and function of like components may not be repeated for each of the illustrated embodiments.

In the embodiment illustrated in FIG. 3, needle 186 comprises a groove 190 and the bore that receives needle 186 has straight walls surrounding the needle such that upper chamber 192 is formed between groove 190 and the walls of the bore. In this embodiment, groove 190 is preferably designed with a span in the needle's longitudinal direction that allows constant communication between passages 132, 138 and upper chamber 192, independent of the movement of needle 186 within the bore.

FIGS. 4, 5 and 6 show a second illustrated embodiment of the disclosed fuel injection valve. As shown in FIG. 6 which is a section view of valve body 102 at section A-A shown in FIG. 4, liquid fuel is supplied to inlet 230 and then to the liquid fuel supply line which comprises passage 232. Passage 232 communicates with intensifier 136 via connecting passage 138. Passage 232 is provided with one-way valve 234 to ensure the one-way flow of liquid fuel from inlet 230 to connecting passage 138. As shown in FIG. 4, pressurized liquid fuel is supplied from the intensifier to cavity 104 via connecting passage 138, upper chamber 122 and the restricted flow passage provided by annular gap 120.

Fuel injection valve 200 operates similarly to fuel injection valve 100 as described with respect to FIGS. 1 and 2. When solenoid 140 is energized, hydraulic fluid control valve 142 opens, plunger 144 is lifted and liquid fuel is drawn in intensifier cylinder 152 from liquid fuel inlet 230 through passage 232 and connecting passage 138. When the desired amount of liquid fuel is introduced in cylinder 152, solenoid 140 is de-energized, hydraulic fluid control valve 142 closes and hydraulic fluid is supplied to drive chamber 150, pushing plunger 144 down and forcing the liquid fuel out of cylinder 152. Pressurized liquid fuel is delivered to cavity 104 by flowing through connecting passage 138 and upper chamber 122 and being pushed down through the restricted flow passage provided by annular gap 120.

In this embodiment, liquid fuel does not pass through upper chamber 122 en route to the intensifier. Liquid fuel only passes through upper chamber 122 en route to cavity 104 from connecting passage 138. An advantage of this arrangement is that liquid fuel leakage through the restricted flow passage can be substantially reduced and, as a consequence, the amount of liquid fuel supplied to cavity 104 can be better controlled.

As shown in FIG. 5, for fuel injection valve 200, the passages for delivering gaseous fuel to cavity 104 and the actuator for controlling the actuation of valve needle 106 can be the same as the arrangement shown for fuel injection valve 100 in FIG. 2. That is, gaseous fuel is supplied to fuel injection valve 200 at gaseous fuel inlet 126 and from there gaseous fuel flows through passage 128, into cavity 104. Liquid fuel delivered to cavity 104 can accumulate there with the gaseous fuel between injection events. When solenoid 114 is energized and valve needle 106 is lifted, both gaseous and liquid fuels are injected into the combustion chamber through orifices 112 that are provided in the nozzle end of fuel injection valve 200.

A third embodiment of the disclosed fuel injection valve is illustrated in FIGS. 7, 8 and 9. In this embodiment liquid fuel discharged from intensifier 136 flows to cavity 104 through connecting passage 138, and a restricted flow passage provided by restriction orifice 320 in passage 322. Restriction orifice 320 prevents substantially any liquid fuel from leaking into cavity 104 through passage 322, except when the metered amount of liquid fuel is discharged from intensifier 136. An additional one-way valve (not illustrated) can be installed in passage 322 upstream of restriction orifice 320 to allow the one-way flow of liquid fuel from intensifier 136 to cavity 104 only when the pressure of the liquid fuel is over a predetermined value.

Fuel injection valve 300 operates similarly to the valve described in the first and second embodiments. Liquid fuel is drawn into intensifier 136 when solenoid valve 140 is energized, and pressurized liquid fuel is discharged from intensifier 136 into cavity 104 through passage 322 when solenoid 140 is de-energized and plunger 144 displaces liquid fuel from the intensifier's cylinder. An advantage of this embodiment is that it can allow better control of the amount of liquid fuel supplied to cavity 104 because of the location and presence of restriction orifice 320 and/or the above-described one-way valve installed on passage 322. The leakage of liquid fuel into cavity 104 is therefore substantially reduced. Also, liquid fuel flowing through restriction orifice 320 reaches cavity 104 in a partially atomized state allowing better mixing of the liquid and gaseous fuels before they are co-injected into the combustion chamber. In this embodiment the valve body can comprise an additional fluid passage (not shown) to supply high pressure liquid fuel to a groove (not shown) in valve body 102 to create a sealing ring filled with liquid fuel, surrounding needle 106. The sealing groove is oriented transverse to the longitudinal axis of needle 106. Such a sealing ring can prevent fluid from escaping from cavity 104 to control chamber 174 and can also improve needle lubrication.

In FIGS. 10 and 11 fuel injection valve 400 illustrates a fourth embodiment of the disclosed fuel injection valve. In this embodiment connecting passage 138 communicates with cavity 104 through two flow paths. One flow path comprises connecting passage 138, upper chamber 122 and a first restricted flow passage provided by annular gap 120, and the other flow path comprises a second restricted flow passage provided by passage 422 and restriction orifice 420. Passage 422 further comprises one-way valve 424, positioned upstream of restriction orifice 420. Liquid fuel is supplied from inlet 130 through the liquid fuel supply line which comprises, passage 132, upper chamber 122, connecting passage 138, the first restricted flow passage and the second restricted flow passage into cavity 104. Gaseous fuel is supplied from gaseous fuel inlet 126 through passage 128 into cavity 104.

Fuel injection valve 400 operates similarly to the valves described in the previous embodiments. The metered amount of liquid fuel that is displaced from intensifier cylinder 152 is pushed through both of the restricted flow paths into cavity 104 when solenoid 140 is de-energized. In this embodiment a first portion of the liquid fuel that is injected into cavity 104 through restriction orifice 420 in passage 422 is partially atomized which improves mixing between this portion of liquid fuel and the gaseous fuel in cavity 104. At the same time, by pushing liquid fuel through upper chamber 122 and the restricted flow passage provided by annular gap 120, needle 106 is better lubricated.

In this embodiment, liquid fuel can be supplied to fuel injection valve 400 through passage 132 that passes through upper chamber 122, as illustrated in FIGS. 10 and 11 or, alternatively, through a passage (not illustrated) that communicates directly with the fuel intensifier like the embodiment illustrated in FIG. 6.

The intensifier and the valve needle can be actuated independently, each through a hydraulic fluid control valve controlled by a solenoid as described above, so that the metering of liquid fuel and its delivery into the nozzle cavity are done when the valve needle is either in its seated position or when the needle is lifted from its seated position (during an injection event).

The previously discussed embodiments show fuel injection valves that employ separate and independent actuators for the valve needle and an intensifier. In the embodiment illustrated in FIGS. 12 and 13, fuel injection valve 500 comprises solenoid 510 that controls hydraulic fluid control valve 512 to actuate both valve needle 106 and liquid fuel intensifier 536. Liquid fuel is supplied to liquid fuel inlet 130 and from there within valve body 102 to cavity 104 via the liquid fuel supply line which comprises passage 132, upper chamber 122, connecting passage 138 and the restricted flow passage provided in this embodiment by annular gap 120. Gaseous fuel is supplied to gaseous fuel inlet 126 and from there within valve body 102 to cavity 104 via passage 128.

A combination of three-way spool valves allow one actuator to control both valve needle 106 and intensifier 536. When solenoid 510 is de-energized, control valve member 512 is in the position illustrated in FIG. 12, whereby the drive chamber 150 is connected to drain 558. With the pressure within drive chamber 150 reduced to drain pressure, drive piston 546 and plunger 544 rise so that the top of drive piston 546 stops against the top of drive chamber 150 (or some other feature provided to stop the travel of drive piston 546), maximizing the amount of liquid that is drawn into cylinder 152 from connecting passage 138. With drive piston 546 in the shown position, control chamber 174 is fluidly connected to high pressure hydraulic fluid from hydraulic fluid inlet 576 through passage 574 and the passage formed by the annular groove 548 in drive piston 546. The fluid pressure created in chamber 174 keeps needle 106 in its seated position.

When solenoid 510 is energized, control valve member 554 is lifted and drive chamber 150 is fluidly connected to hydraulic fluid pressure inlet 560. Consequently, intensifier's plunger 544 is driven downwards pushing a metered amount of liquid fuel from cylinder 152 into cavity 104 through connecting passage 138, upper chamber 122 and on through the restricted flow passage provided by annular gap 120. At the same time, by lowering drive piston 546, groove 548 connects control chamber 174 to drain 572. The pressure in control chamber 174 is reduced and consequently fluid pressure in cavity 104 lifts needle 106 from its seat. Once valve needle 106 lifts, gaseous and liquid fuels accumulated in cavity 104 are co-injected into the combustion chamber through injection orifices 112.

As further illustrated in the hydraulic diagrams of FIGS. 14 and 15, the movement of the intensifier's plunger and of the needle can be controlled to achieve different operational modes by employing different control valves for controlling the delivery of high pressure liquid fuel to the hydraulic actuators.

FIG. 14 depicts fuel injection valve 600 which is essentially the same as fuel injection valve 100, shown in FIGS. 1 and 2, except that hydraulic fluid control valves 116 and 142 are replaced with control valve 618. Liquid fuel delivered to fuel injection valve 600 from common rail 617 is split between two branches, one branch leading to control valve 618 and the other branch leading to liquid fuel inlet 130. In this embodiment, in addition to common rail 617, control valve 618 is connected to drive chamber 150 for controlling operation of intensifier 136, control chamber 174 for controlling operation of valve needle 106, and drain line 619. Control valve 618 comprises a valve member with fluid passages for switching the connection with drive chamber 150 and control chamber 174 between common rail 617 and drain 619. In the shown position, control valve 618 connects common rail 617 with drive chamber 150 and control chamber 174, so that high pressure liquid fuel occupies these chambers to hold plunger 144 and valve needle 106 in the downward positions as shown. When control valve 618 is switched to connect drive chamber 150 and control chamber 174 to drain line 619, the liquid fuel pressure decreases in these chambers and plunger 144 retracts and valve needle 106 lifts. When this happens, liquid and gaseous fuel that has accumulated in cavity 104 is co-injected into the combustion chamber through nozzle orifices 112, and at the same time, liquid fuel is drawn into cylinder 152 from connecting passage 138 and upper chamber 122. To end the injection event, control valve 618 is switched back to the depicted position to re-connect drive chamber 150 and control chamber 174 with common rail 617. This pushes valve needle 106 down until it presses against the valve seat, ending the injection event. At the same time, high pressure liquid fuel re-introduced into drive chamber 150 pushes plunger 144 downwards to expel liquid fuel from cylinder 152, metering a predetermined amount of liquid fuel into cavity 104, where it accumulates until it is co-injected with the gaseous fuel in the next injection event.

FIG. 15 shows another arrangement similar to that of FIG. 14, but in this embodiment control valve 718 comprises a valve member with fluid passages that connect drive chamber 150 to drain 719 while control chamber 174 is connected to common rail 717, and vice versa. Other than this difference in the control valves, fuel injection valve 700 can be the same as fuel injection valve 600. When control valve 718 is in the position shown by FIG. 15, control chamber 174 is connected to common rail 717 and valve needle 106 is pressed against the valve seat, so that fuel injection valve 700 is closed. At the same time, drive chamber 150 is connected to drain 719 so plunger 144 is retracted, and a metered amount, which is predetermined by the volume of cylinder 152 below plunger 144, is held within cylinder 152. Between injection events, to reduce leakage through the restricted flow passage provided by annular gap 120, the pressure of the gaseous fuel and the liquid fuel within fuel injection valve 700 is kept close, and to prevent gaseous fuel from leaking into the hydraulic fluid passages, liquid fuel pressure is preferably kept slightly higher than gaseous fuel pressure. Consequently, some liquid fuel can flow from upper chamber 122 into cavity 104 through annular gap 120 between injection events. When an injection event is commanded, the valve member in control valve 718 switches positions and drive chamber 150 is connected to common rail 717 and control chamber 174 is connected to drain 719. When this happens, valve needle 106 lifts while at the same time, intensifier 136 is actuated to expel liquid fuel from cylinder 152 to ensure that at least the predetermined amount of metered liquid fuel is pushed through annular gap 120 and co-injected with the gaseous fuel. To end the injection event the valve member in control valve 718 switches back to the position shown in FIG. 15.

In the preferred embodiments described above the fuel injection valve comprises an internal liquid fuel intensifier. A person familiar with the technology involved here would understand that the internal intensifier can be replaced by an external liquid fuel intensifier, placed outside of the injection valve body and fluidly linked to the injection valve. Furthermore, as illustrated in FIGS. 16 and 17, the fuel injection valve can operate in a similar manner by employing a valve and a high pressure liquid fuel source instead of an intensifier. In this embodiment, liquid fuel is supplied to fuel injection valve 800 at liquid fuel inlet 830 and then through a restricted flow passage provided by restriction orifice 820 in passage 822 to cavity 104. Passage 822 further comprises one-way valve 824, positioned upstream of restriction orifice 820.

One-way valve 824 allows the one-way flow of liquid fuel from liquid fuel inlet 830 to cavity 104 only when the pressure of the liquid fuel is over a predetermined value. Liquid fuel is supplied from a high pressure liquid fuel source through valve 840 to liquid fuel inlet 830. Valve 840 can be a solenoid actuated valve, similar to hydraulic fluid control valve 116. The metering of the liquid fuel is performed by operating valve 840 to either connect passage 822 to the liquid fuel supply source or to the drain. When passage 822 is connected to the drain, one-way valve 824 closes, and stops the supply of liquid fuel to passage 822. The pressure of the liquid fuel supplied from the liquid fuel source to liquid fuel inlet 830 has to be sufficient to push it through restriction orifice 820 into cavity 104. Liquid fuel flowing through restriction orifice 820 reaches cavity 104 in a partially atomized state allowing better mixing of the liquid and gaseous fuels.

Fuel injection valve 800 operates similarly to the valves described in previous embodiments. A metered amount of liquid fuel displaced when valve 840 allows passage 822 to fluidly connect to the high pressure liquid fuel source is pushed through the restricted flow passage into cavity 104 where it mixes with the gaseous fuel supplied to cavity 104 through passage 128. Liquid and gaseous fuels are co-injected into the combustion chamber of an internal combustion engine when solenoid 114 is energized and valve needle 106 is lifted. A person familiar with the technology involved here will understand that similar solutions for the restricted flow passage can be implemented in this case. For example, the restricted flow passage can be an annular passage provided between the needle and the needle cavity walls as illustrated in FIGS. 1 and 2 or two liquid fuel paths comprising an annular passage and a passage within the valve body provided with a restriction orifice as illustrated in FIGS. 10 and 11.

Fuel injection valve 800 presents some advantages over the embodiments illustrated in FIGS. 1-15 because it further simplifies the construction of the fuel injection valve by reducing the number of components within the valve body. Conversely, the internal intensifier illustrated in FIGS. 1-15 can allow better control over metering liquid fuel into the combustion chamber.

In some embodiments described above, such as in the embodiment illustrated in FIG. 14, the majority of the liquid fuel that is injected is delivered to the cavity when the needle is seated and the fuel injection valve is closed. In other embodiments, such as the one shown in FIG. 15, the majority of the liquid fuel can be introduced when the needle is lifted from its seat. In still other disclosed embodiments, such as the ones that employ an intensifier with a dedicated actuator, such arrangements allow flexibility of determining the timing of introducing the liquid fuel into the cavity.

While particular elements, embodiments and applications of the present invention have been shown and described, it will be understood, that the invention is not limited thereto since modifications can be made by those skilled in the art without departing from the scope of the present disclosure, particularly in light of the foregoing teachings.

What is claimed is:

1. A fuel injection valve for co-injecting a liquid fuel and a gaseous fuel directly into a combustion chamber of an internal combustion engine, the fuel injection valve comprising:
    (a) a valve body comprising a gaseous fuel inlet and a separate liquid fuel inlet, the valve body being mountable in the internal combustion engine with a nozzle end disposed within the combustion chamber;
    (b) a gaseous fuel supply passage for supplying gaseous fuel directly into a cavity of said valve body, said gaseous fuel supply passage disposed within the valve body and in fluid communication with the gaseous fuel inlet and said cavity near the nozzle end;
    (c) a needle disposed in the valve body and moveable between a closed position when it is pressed against a seat associated with the valve body and an open position when the valve is lifted away from the seat, allowing fluid communication between the cavity and the combustion chamber;
    (d) a liquid fuel supply line for separately supplying liquid fuel into said cavity, said liquid fuel supply line disposed within the valve body and in fluid communication with the liquid fuel inlet and the cavity, wherein the liquid fuel supply line comprises a connecting passage and a restricted flow passage defined within the valve body or between the valve body and the needle, the restricted flow passage dimensioned to control liquid fuel flow into the cavity; and
    (e) an actuator that is operable to move the needle between the closed position and the open position,
    wherein said connecting passage is in fluid communication with said cavity through said restricted flow passage even when the needle is in its closed position.

2. The injection valve of claim 1 wherein the needle has a solid body.

3. The injection valve of claim 1 further comprising an intensifier with an outlet in communication with the liquid fuel supply line to increase the pressure of the liquid fuel within the liquid fuel supply line upstream from the restricted flow passage.

4. The injection valve of claim 3 wherein the intensifier is disposed within the valve body and comprises a plunger that moves within a cylinder to meter the liquid fuel by drawing liquid fuel into the cylinder and then discharging a metered amount of the liquid fuel from the cylinder.

5. The injection valve of claim 4 wherein actuation of the plunger is adjustable to change the distance the plunger travels, whereby the metered amount can be changed.

6. The injection valve of claim 4 wherein the plunger is hydraulically actuated by a driving piston that has cross-sectional area that is larger than the cross-sectional area of the plunger whereby the larger cross-sectional area of the driving piston enables the liquid fuel to be pressurized to a higher pressure than the pressure of the hydraulic fluid acting on the driving piston.

7. The injection valve of claim 6 wherein the liquid fuel supply line is in communication with hydraulic fluid passages associated with the driving piston whereby the liquid fuel is employed as the hydraulic fluid for driving the intensifier.

8. The injection valve of claim 1 further comprising a one-way valve disposed in the restricted flow passage, the one-way valve allowing liquid fuel to flow into the cavity and preventing fluid from escaping from the cavity through the restricted flow passage.

9. The injection valve of claim 1 further comprising an upper chamber formed between the needle and the valve body, the upper chamber being in fluid communication with the liquid fuel supply line and separated from the cavity by an annular gap between the needle and the valve body, wherein the annular gap serves as the restricted flow passage through which liquid fuel can flow into the cavity.

10. The injection valve of claim 9 wherein the upper chamber is formed by a channel in the valve body or a transverse groove in the needle.

11. The injection valve of claim 3 further comprising a second actuator that is operable to activate the intensifier.

12. The injection valve of claim 1 wherein the liquid fuel supply line comprises a one-way valve allowing liquid fuel to flow from the liquid fuel inlet to the restricted flow passage and preventing fluid from escaping from the cavity through the liquid fuel supply line.

13. A method of co-injecting a liquid fuel and a gaseous fuel directly into a combustion chamber of an internal combustion engine, the method comprising:
  delivering the gaseous fuel directly to a cavity within a fuel injection valve, the cavity being in communication with the combustion chamber when a needle lifted away from a valve seat of the fuel injection valve;
  delivering the liquid fuel to the cavity separately through a liquid fuel supply line that comprises a connecting passage and a restricted flow passage disposed within a body of the fuel injection valve or between the body and the needle, said restricted flow passage dimensioned to control liquid fuel flow into the cavity, whereby at least some of the liquid fuel mixes with the gaseous fuel in the cavity before lifting the needle from the valve seat; and
  co-injecting the liquid and gaseous fuels into the combustion chamber from the cavity by lifting the needle away from the valve seat,
  wherein said connecting passage is in fluid communication with said cavity through said restricted flow passage even when the needle is in its closed position.

14. The method of claim 13 further comprising regulating flow of the liquid fuel through the restricted flow passage by controlling liquid fuel pressure in the liquid fuel supply line upstream from the restricted flow passage.

15. The method of claim 13 further comprising delivering the gaseous fuel to the cavity at injection pressure from a common rail gaseous fuel system.

16. The method of claim 15 further comprising delivering the liquid fuel to the liquid fuel supply line from a common rail liquid fuel system with the liquid fuel pressure being higher than the injection pressure of the gaseous fuel by a predetermined amount.

17. The method of claim 13 further comprising metering the liquid fuel before it is delivered to the cavity of the fuel injection valve.

18. The method of claim 17 wherein the amount of liquid fuel delivered to the cavity of the fuel injection valve is adjusted according to the operation of the internal combustion engine.

19. The method of claim 13 further comprising increasing the pressure and metering the amount of the liquid fuel before it is delivered to the cavity by the operation of an intensifier that communicates with the liquid fuel supply line.

20. The method of claim 13 further comprising controlling the pressure in the liquid fuel supply line independently of the lifting of the needle.

21. The injection valve of claim 10 further comprising a second restricted flow passage within the valve body that fluidly connects the liquid fuel supply line to the cavity.

22. The injection valve of claim 21 wherein the second restricted flow passage comprises a passageway formed by a bore with a restriction orifice disposed therein.

23. The injection valve of claim 21 wherein the second restricted flow passage comprises a passageway formed by a bore with a one-way valve disposed therein, the one-way valve allowing liquid fuel to flow into the cavity and preventing fluid from flowing out of the cavity through the second restricted flow passage.

24. The injection valve of claim 3 wherein the actuator is operable to activate the intensifier in addition to moving the needle.

* * * * *